May 17, 1938.   G. B. TJOFLAT   2,117,636
THERMIONIC ELECTRODE
Filed March 24, 1934   2 Sheets-Sheet 1

INVENTOR
Gerald B. Tjoflat
By Green & McCallister
His Attorneys

May 17, 1938.　　　G. B. TJOFLAT　　　2,117,636
THERMIONIC ELECTRODE
Filed March 24, 1934　　2 Sheets-Sheet 2

INVENTOR
Gerald B. Tjoflat
By Green & McCallister
His Attorneys

Patented May 17, 1938

2,117,636

UNITED STATES PATENT OFFICE 2,117,636

THERMIONIC ELECTRODE

Gerald B. Tjoflat, Mount Lebanon, Pa.

Application March 24, 1934, Serial No. 717,152

29 Claims. (Cl. 250—27.5)

This invention relates to electron emissive electrodes for use in electrical devices such as luminous tubes, rectifiers, and high vacuum space current discharge devices such as radio tubes, for example.

An object of this invention is the provision of an electrode that shall be capable of functioning both as an anode and cathode in gaseous discharge devices of the luminous tube class, or as a directly heated cathode in devices such as rectifiers and audion tubes of the high vacuum type.

Another object of the invention is the provision of a rugged electrode that shall be capable of functioning, when heated, in the same manner as filamentary type cathodes, i. e. cathodes of wire with or without oxide coating, but at higher current densities and for much longer periods of time and which may be more easily and economically manufactured than the filamentary type cathodes.

A further object of the invention is the provision of an electrode that may be made in massive or slug form of a combination of one or more metals of the ferrous group and one or more of the electron emitting materials included in the alkali group or in the alkaline earth group, and which when heated may be operated in much the same manner as a cathode consisting of a filament having an electron emissive coating thereon. Instead of a metal of the ferrous group, other metals may be employed which do not form objectionable or non-emitting compounds with the alkali or alkaline earth groups.

And a further object of the invention is the provision of an electrode of the character referred to above which for all practical purposes, and from the standpoint of commercial utility, is substantially non-sputtering and indestructible from the standpoint of burning out in the sense that filamentary cathodes burn out.

Other objects of the invention will in part be apparent and will in part be obvious from the following description taken in conjunction with the accompanying drawings, in which:

Throughout the drawings and the specification like reference characters indicate like parts.

Figure 1:
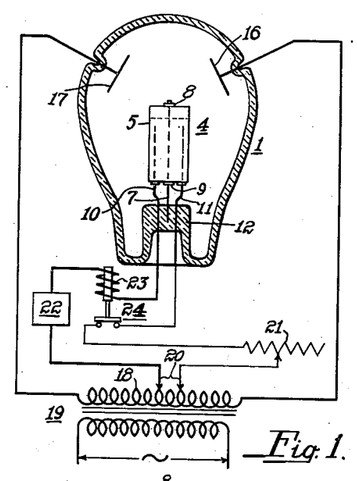
Figure 1 is a more or less diagrammatic view of a rectifier provided with an electrode embodying one form of the invention.
Figure 2:
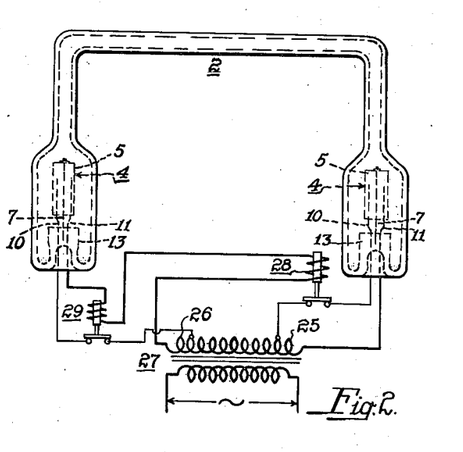
Fig. 2 is a more or less diagrammatic view of a luminous tube provided with electrodes embodying one form of the invention connected in circuit to an alternating current transformer, the apparatus including relays which control the initial heating of the electrodes which facilitate starting of the tube.
Figure 8:
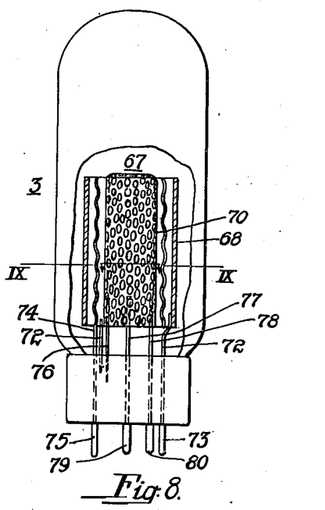
Fig. 8 is a view in side elevation of a space current discharge device such as a three element radio tube provided with a cathode embodying a still further modified form of the invention, the cathode grid and plate being shown in section.

In the drawings, several forms of electrode are illustrated in connection with various types of devices, such as a rectifier 1, as shown in Fig. 1; a luminous tube 2, as shown in Fig. 2, and commonly referred to as neon tubes, and employed primarily for illuminating purposes; and a high vacuum tube 3, for example, a radio tube, as shown in Fig. 8.

When the electrode is employed in a rectifier having a filling of mercury vapor or other ionizable gas, or in a high vacuum tube, it functions when heated as a hot cathode. It may also be operated as a cathode of the directly heated type in that the heat required to raise the temperature thereof to the point at which electron emission occurs may be developed in the materials constituting the electrode much in the same fashion as heat is developed in filamentary cathodes which have a coating of electron emitting oxides thereon and through which electric current is passed.

The electrode embodying this invention, however, differs from the filamentary type cathode in that the active part or element of the electrode is in the form of a rugged slug or mass comprising one or more metals of the ferrous group and one or more electron emitting materials of the alkali or alkaline earth group which have been intimately united by sintering.

When functioning as a cathode of the directly heated type, spaced lead-in conductors attached to the sintered slug or mass are connected to a source of electric power, so that current flows from one conductor through the mass to the other conductor, thereby heating the mass to the temperature at which electron emission occurs.

When the electrode is used as a cathode in a rectifier, the bombardment of the electrode will maintain it at the operating temperature so that the source of heating current may be disconnected. In some cases the heating current may be maintained if that is essential in order to obtain a high current output from the rectifier.

If the electrode is employed in luminous tubes, the filamentary aspect of the electrode may be taken advantage of in order to obtain quick starting of the tube at low tube voltage. Thus, for example, if luminous tubes are employed on direct current circuits, the filamentary aspects of the electrodes may be utilized to heat the electrodes to the temperature at which electron emission occurs so that a relatively low voltage may be employed for starting and maintaining the tube in operation.

In all of the various forms of the electrode shown herein, electron emission is caused to take place from the slug through a slot or aperture formed in a holder, such as a sleeve or housing, either of a refractory insulating material or of a metal which is not injuriously affected by high temperatures and which will not form objectionable non-emitting compounds with the constituent materials of the active part of the electrode.

The electrodes embodying this invention may be made by intimately mixing finely divided particles of one or more alkaline earth materials, preferably the carbonates of such materials, and placing such mixture in a holder with which spaced lead-in conductors are associated. This mixture is tamped slightly in order to obtain a slight degree of compactness, after which it is heated to a temperature sufficient to bind the metal and carbonate particles together and to the holder and the associated lead-in conductors. The heating is preferably done in a reducing gas flame or in a carbonaceous atmosphere. At this stage of the procedure, a relatively porous compact mass comprising a mixture of metal and one or more carbonates of alkaline earth metals is formed.

The electrode is now in condition to be attached to the press of a glass envelope or tube forming part of a rectifier, a gaseous discharge device, such as a neon tube, or in a high vacuum electronic discharge device. When the electrode or electrodes are placed in the envelope of one of these devices, the electrode material in the holder is subjected to further heat treatment while the envelope is outgassed. This heat treatment may be accomplished by ion bombardment or by passing electric current through the slug in the holder, this being accomplished by connecting the lead-in conductors to a suitable source of voltage. When the outgassing procedure has been completed and the envelope sealed off, the electrode materials in the holder have been sintered to such extent that the metal and alkaline earth particles are firmly and intimately bonded together as a coherent mass. Also during the outgassing process of the envelope, and the heat treatment of the electrode materials, the carbonates of the alkaline earth metals are converted to the oxides thereof.

As stated above, the electrode slug is not heated to such a high temperature that the alkaline earth oxide particles are themselves fused on their surfaces or glazed over by the metal particles as this would destroy the electron emissive powers of the electron-emitting particles or oxides. Also the temperature to which the electrode slug is heated during the outgassing process of the device is not carried so high that some of the alkali or alkaline earth particles or oxides are decomposed into oxygen and parent metal. When the electrode is finished, a relatively porous slug composed of metal particles and one or more alkali or alkaline earth particles is attained. This slug is characterized by that the metal particles make sufficient contact throughout the body of the slug as to provide multitudinous conducting paths of the class through which current may flow from one lead-in conductor to another, and that the oxides of the alkaline earth metal or metals employed are not encased in or glazed over by metal, thereby rendering these oxides free to emit electrons when the electrode slug is heated to the temperature required for emission.

The shape of the holder in which the electrode slug is disposed is such that only a relatively small area of the total area of the slug is exposed and from which exposed surface emission can take place. For this reason, the electrode slug has indefinitely long life, in that decomposition of the alkaline earth oxides to the parent metal and oxygen is maintained at such a low rate. Also by reason of the shape of the holder, emission from the slug is caused to pass through a slot in the holder and this feature also tends to retard the rate of decomposition of the oxides of the alkaline earth metals. This retardation may be accounted for, even though the electrode is operated at high voltage, by the fact that a large portion of the parent metal particles which tend to be knocked loose from the slug, strike the wall of the holder and are prevented from escaping, and much of what is thus retained recombines with the oxygen to form oxides of such metal particles.

Since the surfaces of the alkaline earth particles are not fused or glazed over by fused metal particles, and since the slug is porous, it is not necessary to operate the electrode slug at as high a temperature as oxide coated filaments are operated in order to obtain a high rate of emission. As the electrode slug may be operated at lower temperatures than oxide coated filaments to obtain the same or higher rate of emission, this also tends to prolong the life of the electrode and to retard the rate at which the oxides of the alkali or alkaline earth particles are decomposed.

Figures 3, 4:
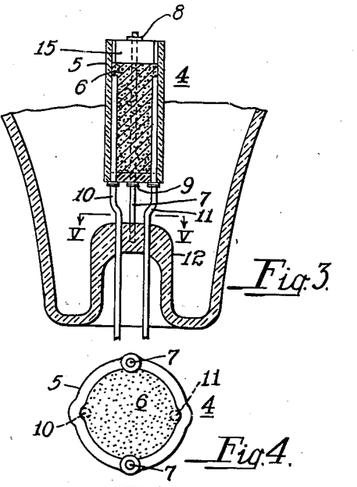
Fig. 3 is a view in vertical section of an electrode such as shown in Figs. 1 and 2 and of a portion of a glass envelope in which the electrode is mounted.
Fig. 4 is an enlarged top plan view of the electrode shown in Figs. 1, 2 and 3.
Figure 5:
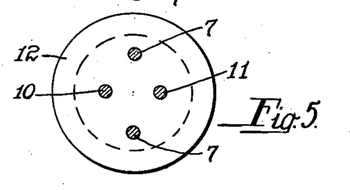
Fig. 5 is a view in section taken on line V—V showing the manner in which the electrode illustrated in Figs. 1, 2 and 3 are mounted and the manner in which the lead-in conductors are disposed in and connected to the active portion of the electrode.

The electrode shown in connection with the rectifier and the luminous tube of Figs. 1 and 2, respectively, is illustrated in Figs. 3, 4 and 5 and is designated by reference character 4. This electrode comprises a sleeve or cylinder 5 of porcelain, or other suitable refractory insulating material, having therein a sintered mass or slug 6 comprising one or more metals of the ferrous group and one or more materials of the alkaline earth group. In addition to the elements of the ferrous and alkaline earth groups additional materials of an inert and electrically non-conductive nature may be added in order that, throughout the life of the electrode, its ohmic resistance may not change to such extent as to render the electrode inoperative from the standpoint of its filamentary characteristic. As shown in Fig. 3, the electrode is mounted on a pair of supports 7, which extend through openings formed longitudinally of the refractory sleeve 5. These supports and the openings through which they extend are preferably disposed on diametrically opposite sides of the refractory sleeve. The sleeve 5 is anchored to the supports at the upper and lower ends thereof as indicated at 8 and 9, to hold the electrode in place thereon.

In order that the electrode may function as a filamentary cathode, two spaced lead-in conductors 10 and 11 are provided and these lead-in conductors extend into the refractory cylinder in firm contact with the sintered mass or slug 6 to which the lead-in conductors are preferably fused. The supports 7 are disposed in the press 12 of the envelope of rectifier 1, or in the presses 13 of the luminous tube 2, while the lead-in conductors extend through these presses for connection to a source of power as is well understood in the art.

The electrodes 4 may be made by inserting the lead-in conductors 10 and 11 through the lower end of sleeve or cylinder 5 which as shown, is closed, and then filling the sleeve with a finely divided or comminuted mixture of one or more elements of the ferrous group, and one or more elements of the alkaline earth group, and where necessary, electrically non-conductive materials, or materials having high ohmic resistance which do not form objectionable compounds with the elements of the alkaline earth group. In making these electrodes, it is preferred to employ a mixture of finely divided nickel, as this metal does not form objectionable compounds with the alkaline earth materials, carbonates of barium and/or strontium, and either finely divided zirconium oxide, powdered or finely divided alloy of nickel chromium (known to the trade as nichrome), boron, or a mixture of these elements. This mixture is then placed in sleeve 5 and tamped or compacted after which it is initially heated, preferably in a reducing flame, to a temperature such as will cause the compacted mass to become hard or firm. This temperature, however, should not be so high that the carbonates of barium and/or strontium are converted to the oxides thereof. The electrodes may then be secured to a press and sealed to the envelope of the particular device in which it is to be used. If used in the envelope of a luminous tube such as indicated at 2, a relatively high alternating current voltage is applied to the electrodes such as will cause the electrode material to be highly heated by ion bombardment, and while being thus heated, the tube is pumped to remove air and occluded gases. The tube may be pumped one or more times as the case requires, and on the final pumping, inert gas such as neon, or its equivalent, is admitted to the tube at the proper pressure, and the tube sealed off. During this outgassing process, the electrode material of the electrodes is heated to the point where the carbonates of barium and strontium are converted to the oxides thereof. This treatment also sinters the constituents of the slug or mass 6 and during this sintering process, the nickel and the oxide particles of barium and strontium are fused together to form a porous slug which is self-sustaining and anchored to the sleeve 5.

If the carbonates are converted to the oxide form before the electrode is placed in the envelope in which it is to be used, the oxides would be changed by the moisture in the air to the hydroxides of barium and/or strontium, in which form they are inoperative for the purposes of this invention, because the hydroxides would boil off during the outgassing process.

In the electrodes above described, the nickel is the electrical conducting medium, the oxides (which are not electrically conducting) are the electron emitting media thereof, while the inert substances such as the powdered nickel chromium alloy, or the boron, or the zirconium oxides, give to the electrode slug 6 a relatively constant ohmic resistance whereby it may operate as a filament for a long period of time.

The relative amounts of metal and elements of the alkali or alkaline earths may vary, but a satisfactory mixture is obtained by employing nickel and alkaline earths in equal amounts; i. e., a mixture of say nickel 50% and barium carbonate 50%; or a mixture of nickel 50% and barium carbonate 25% and strontium carbonate 25%. The amounts of nickel may be more or less than 50% and the amounts of the carbonates of alkaline earths may be more or less than above stated. The greater the amount of nickel the more conductive the electrode slug will be, and conversely the greater the amounts of alkaline earth material employed in relation to nickel, the greater the resistance of the sintered slug will be, because the alkaline earth oxides have insulating properties and are substantially non-conductive electrically. The amount of metal should not be so low that hot spots are likely to develop, nor should the amount of metal be so great that there is a deficiency in the electron emitting elements. A proper balance between them should be employed for reasons well understood by those skilled in this art.

The amount of powdered nickel chromium, zirconium oxide, boron, or other equivalent material employed, may be varied considerably depending on the ohmic resistance desired in the slug but the amount of any of these materials employed should be considered independently of the relation of metal to the alkaline earth materials above mentioned.

As shown in the drawings above, sleeve 5 is not filled full with the electrode mixture of metal and alkaline earth elements but is only partially filled so as to provide a cavity 15 at the upper end of the sleeve or cylinder 5 through which all electronic discharge takes place. This cavity, in effect, constitutes a slot through which the electrons discharge. Since the sleeve is of electric insulating material, the electrons which strike the walls thereof are not absorbed thereby, but are reflected therefrom.

In making an electrode 4 for rectifiers, such as shown in Fig. 1, the electrode is mounted in the envelope, after which the same is outgassed during which time the electrode is heated to a high temperature. The heating of the electrode may be accomplished by ion bombardment or by connecting the lead-in conductors 10 and 11 to a source of relatively low voltage to effect a flow of current through slug 6. The flow of current through the slug heats the same to a relatively high temperature in the same manner as the ordinary filament is heated. The electrode may be also heated during the outgassing process by a combination of resistance and bombardment heating.

When an electrode 4 is employed in a rectifier such as indicated at 1, in Fig. 1 (which rectifier may be of the double-wave or half-wave type), the anodes indicated at 16 and 17 are connected to the opposite terminals of the secondary winding 18 of an alternating current transformer 19 while one of the lead-in conductors, either 10 or 11, is connected to the electrical midpoint of the transformer. In order to heat the electrode slug 6 to the temperature at which electrode emission occurs, the lead-in conductors 10 and 11 are connected across a low voltage portion 20 of the secondary winding 18. An adjustable resistor 21 may be connected in series with the heating circuit of the electrode slug 6 in order that heating current may be adjusted to a value that will give the best results.

The direct current load circuit of the rectifier is indicated at 22. In series with the load circuit, a current responsive coil 23 of a relay 24 is connected which controls the connection or disconnection of the heating circuit for the electrode slug 6 to the low voltage tap of the transformer. When the electrode has been heated up to the point where electron emission occurs, the rectifier starts and when the output current in the load circuit increases to a predetermined value, relay 24 opens thereby disconnecting the circuit conductor connected to lead-in wire 11. The electrical discharge from the electrode will, for all practical purposes, maintain the temperature of the electrode slug at that value necessary to maintain the rectifier in operation.

The anodes of the rectifier may either be of carbon or carbonized nickel so that in case any of the electron emitting material of the electrode slug is driven loose from the electrode, such will not adhere to the anodes. Backfiring of the rectifier will therefore, not occur.

Where the electrodes are employed in a luminous tube such as indicated at 2 in Fig. 2, one electrode is employed at each end of the tube as these electrodes will function both as cathode and anode. The filamentary aspect of cathode 4 when employed in a luminous tube may be taken advantage of and connected to low voltage taps 25 and 26 of the secondary winding of a transformer 27, and a pair of current responsive relays, the coils 28 and 29 of which are connected in series with the electrodes, may be utilized to disconnect one of the lead-in conductors of each of these electrodes from the transformer when the tube is in operation.

Where luminous tubes are employed on alternating current circuits the filamentary aspects of the electrodes may not be so important, because a relatively high voltage is required to start these tubes at the start of each half cycle of the voltage. Once started, however, a low, direct current voltage will maintain them in operation. Therefore, if luminous tubes are employed on direct current circuits for illumination purposes instead of for sign purposes, the filamentary aspects of the electrode 4 will work to decided advantage in that a direct current voltage of 200 volts or less may be employed. By utilizing the filamentary aspect of the electrodes for heating slugs 6 to operating temperature, a low direct current voltage impressed across the tube will start and maintain it in operation.

The diameter of the electrode slug 6 when employed in luminous tubes may be very small as the area of the electrode slug in transverse section may be materially less than 1.50 amperes per square decimeter. When the electrodes are employed in rectifiers however, the diameter of slug 6 may be made as large as practicable depending on the capacity of rectifier desired. For example, an electrode slug 6 of a diameter of the order of one inch will pass current of the order of nine hundred to one thousand amperes at a voltage of one thousand or less, impressed across the anode and cathode thereof.

Figure 6:
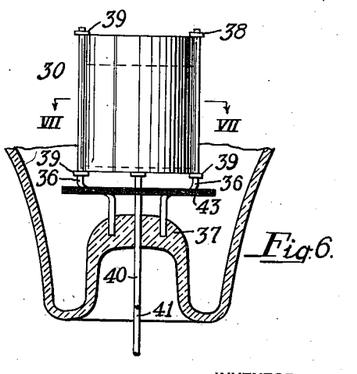
Fig. 6 is a view in side elevation of an electrode embodying a modified form of the invention shown mounted in a glass envelope, for example, that of the rectifier of Fig. 1, only a portion of the envelope being illustrated.
Figure 7:
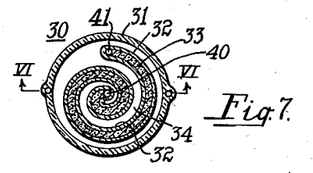
Fig. 7 is a view in section of the electrode shown in Fig. 6 taken on line VII—VII thereof.

In Figs. 6 and 7, a different type of electrode is shown for use in rectifiers and is designated by reference character 30. This type would be employed on rectifiers of high capacity and is so constructed as to conserve the heat developed in the cathode material thereof.

The electrode shown in Figs. 6 and 7 comprises an outer sleeve 31 of refractory material, such as porcelain, within which spaced walls 32 of porcelain, or refractory material are disposed, and shaped somewhat in the form of a spiral. The space between these walls is filled with electrode material of the character described in connection with electrode 4 to form a spiral slug 33. The spiral walls as shown are spaced from the outer wall 31 and include also a spiral-like space 34 which may either be left void or filled with insulating material. Space 34 and the space between the outer wall and the spiral serves as an insulator to conserve the heat developed in the electrode slug, while the outer wall 31 serves as a shield to protect the glass of the envelope in which the electrode is mounted, as well as to aid in the conservation of the heat developed in the electrode.

Electrode 30 may be mounted in an envelope on supports 36 which extend through openings formed longitudinally of the outer wall 31. These supports are sealed in the press 37 of the envelope and are disposed diametrically opposite each other. The electrode is anchored to the supports as indicated at 38 and 39, so that it cannot move thereon.

In order to utilize the filamentary aspect of the electrode slug 33, lead-in conductors 40 and 41 are inserted through the bottom of the sleeve or housing formed by walls 32 into the inner and outer ends, respectively, of the spirally formed slug. By forming the slug of electrode material in the shape of a spiral, uniform current distribution is effected throughout the entire body thereof with the result that uniform heating may be obtained and in electrodes of large size, uniform current distribution throughout the electrode material, when it functions as a filament, is quite important.

The press of the envelope may be protected from the heat generated in the electrode slug by means of a shield 43 of insulating material such as mica. A mica shield, or a shield of insulating material may also be utilized in rectifier 1 and in the luminous tube 2 if necessary.

Figure 10:
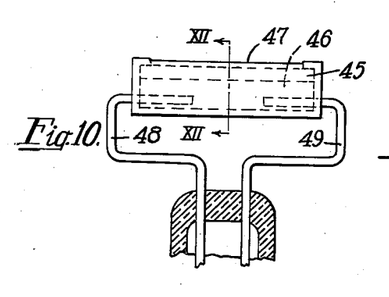
Figs. 10 and 11 are side elevation and top plan views, respectively, of an electrode embodying a modified form of the invention.
Figure 11:
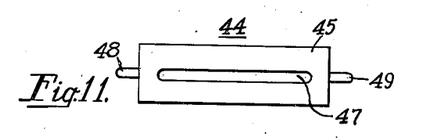
Figure 12:
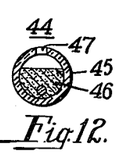
Fig. 12 is a view in section taken on line XII—XII of Fig. 10.

In Figs. 10, 11, and 12, an electrode 44 is shown that comprises a tubular sleeve 45 of refractory material, such as porcelain, arranged for horizontal mounting or transverse mounting in an envelope. This sleeve is filled lengthwise with a slug 46 composed of the electrode material above described in connection with the formation of the slug 6 in electrode 4 or in the electrode shown in Figs. 6 and 7. This slug however, does not fill the complete diameter of the sleeve as is shown in Fig. 12. A slot 47 is formed longitudinally of the sleeve in a side thereof through which the discharge takes place.

A pair of lead-in wires 48 and 49 extend into sleeve 45 and the slug therein from opposite ends of the sleeve and pass through the press of the envelope in which the electrode is to be used. When employing the filamentary aspect of the electrode, these lead-in wires are connected to a source of power and when operating in a tube such as indicated in Fig. 2, or in a rectifier, as indicated in Fig. 1, only one of these lead-in wires is connected to a source of power after the rectifier or tube has been started.

The electrode of Figs. 10, 11, and 12 may be made and treated in the same manner as the electrode shown in connection with the rectifier of Fig. 1 and the luminous tube of Fig. 2.

Figure 15:
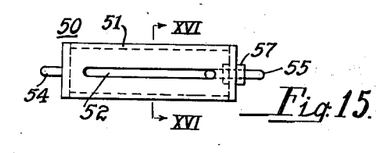
Fig. 15 is a top plan view of an electrode which is a modified form of the electrode shown in Fig. 14.
Figure 16:
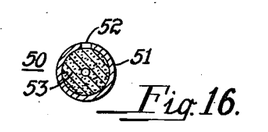
Fig. 16 is a view in section of the electrode shown in Fig. 15 taken on line XVI—XVI thereof.

In Figs. 15 and 16, an electrode 50, of different type, is shown. This electrode is mounted in substantially the same manner as the electrode shown in Figs. 10 and 11, but the sleeve 51 thereof is of metal, such as nickel, instead of refractory insulating material. An elongated slot 52 is formed in one side of the sleeve through which the discharge takes place from the sintered mass or slug 53 disposed within the sleeve which completely fills the same. Slug 53 is composed of the electrode materials previously described herein. Where a sleeve of metal is employed, it is preferred to completely fill the same to facilitate discharge through the slot, although the electrode will function even though the sleeve is not completely full.

The ends of the metal sleeve 51 are closed, and a lead-in wire or conductor 54 is welded or otherwise secured to one end thereof. A lead-in wire or conductor 55 extends through the other end of the sleeve into the sintered slug or mass 53 to which it is fused. Lead-in wire 55 as shown, is insulated from the metal sleeve and its end cap or closure by means of a bushing 57. When using the electrode shown in Figs. 15 and 16 as a directly heated cathode, current is passed through the sintered slot by connecting the lead-in wires to a source of power. When using it as a cathode in a gaseous discharge device where the discharge is maintained by positive ion bombardment and the electron emission which occurs when the electrode slug is hot, only one of these lead-in wires need be connected to a source of voltage after discharge is started.

Figure 13:
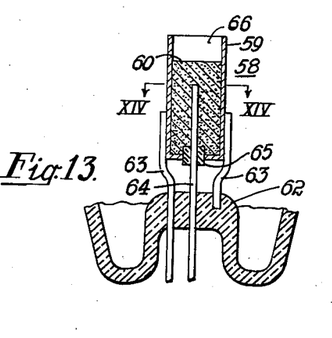
Fig. 13 is a view in vertical section of an electrode embodying a still further modified form of the invention.
Figure 14:
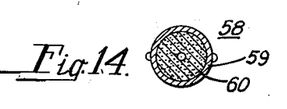
Fig. 14 is a view in section taken on line XIV—XIV of Fig. 13.

In Figs. 13 and 14, an electrode 58 is shown that comprises metallic sleeve or cylinder 59 of nickel or other metal which withstands high temperatures and which will not form objectionable compounds with the electrode slug 60 disposed within this cylinder or holder and composed of electrode material such as has been described herein in connection with electrodes 4, 30, 44, and 50. Cylinder 59 is closed at its bottom and is supported on a press 62 of an envelope by means of a support 63 and lead-in wires 64 and 65. Lead-in wire 64 is fused or welded to the outside surface of sleeve 59 while lead-in wire 64 extends centrally into the sintered slug 60 through the bottom of the cylinder. Lead-in wire 64 is insulated from the cylinder by means of an insulating bushing 65. As may be seen in Fig. 13, cylinder 59 is not completely full, that is, the sintered slug does not completely fill the same, so that a slot or cavity 66 is formed at the upper end of the cylinder through which the electron emission takes place.

Figure 9:
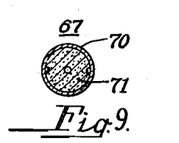
Fig. 9 is a view of the cathode shown in Fig. 8 taken on line IX—IX thereof.

In Fig. 8 vacuum tube 3 is shown as being provided with a cathode 67, an anode 68, and a grid 69, the anode and grid being illustrated schematically. The cathode comprises a cylinder 70 which is closed at both ends, the cylinder being of metal, preferably nickel, the walls of which are perforated as shown. This cylinder is preferably completely filled with a sintered slug 71 of electrode material comprising finely divided metal, such as nickel, and one or more elements of the alkaline earth group, and if necessary, finely divided material which tends to stabilize the ohmic resistance of the sintered slug. The anode or plate 68 is mounted in the tube on a support 72, one of which is connected to a terminal 73; grid 69 is mounted on a support 74 which is connected to a terminal 75, and cathode 67 is carried by a support 76, which terminates in the press of the tube, and two spaced lead-in conductors 77 and 78 which are connected to terminals 79 and 80. Terminal 77 extends through the bottom of the cathode into the interior of the sintered slug or mass which forms the active part of the cathode, and lead-in conductor 78 is fused or welded to the metallic sleeve 70. When this cathode is employed in a tube such as indicated at 3, say for example it is a radio tube, current is passed through slug 71 disposed within sleeve 70 while the grid, plate and cathode are connected in a circuit necessary to make the tube function, as an amplifier, for example. When slug 71 is heated to a high temperature, electron emission takes place from the slug through the apertures or slots in sleeve 70 to plate or anode and the flow of current takes place from the plate to the slug which functions as a cathode; the variation in the plate current being effected by variations in the grid potential.

In all the various forms of electrode illustrated herein, it is apparent that a rugged electrode is provided which may function either as anode or cathode, and that when used in a high vacuum tube, it functions as a directly heated cathode because the sintered mass or slug embodied in each of these electrodes may be utilized as a filament. However, since the slug is rugged and contains considerable mass, it is not as delicate and likely to burn out as are oxide coated filaments employed in rectifiers and high vacuum tubes.

During operation of the electrodes shown in Figs. 4, 6, and 10 to 16, inclusive, the sintered slugs embodied therein tend to disappear with use and to improve with age, and to become uni-potential cathodes.

The cathode shown in connection with the vacuum tube in Fig. 8 also embodies these characteristics in that the slug tends to disappear after long continuous use but as the length of time in which the tube is operated increases, the sintered slug tends to take on the form of a uni-potential cathode.

Electrodes made in accordance with this invention have decided advantage over filamentary type cathodes in that the process of making is simple as it requires merely the packing of a sleeve, holder, or housing with the electrode material and sintering the same after it has been mounted in the particular device in which it is to operate. Furthermore, the drawing of the sintered mass or slug into filamentary form is not necessary in that the slug embodies conducting paths of the first class having sufficient resistance to develop the heat necessary to raise the temperature of the electron emissive or emitting material to the temperature at which emission will take place.

Since the sintered slug is rugged and massive and held together in a holder, it will not break and become inoperative for that reason.

It has been found that sintered slugs of metal such as nickel and elements of the alkaline earth group when sintered into slug or mass form will, after long periods of use, become an alloy of the metal of the ferrous group and a metal of the alkaline earth group and that this alloy is malleable. Since the slug tends to form an alloy of this nature it may be necessary in order to utilize the filamentary aspect thereof, to mix with the finely divided metal, such as nickel, and the carbonates of the elements of the alkaline group, an inert substance or substances such as zirconium oxide or nickel chromium alloy or boron. These substances will give to the electrode slug, sufficient resistance to insure that the heat required will be developed.

Having thus described the invention, what I claim as new and desire to secure by Letters Patent is:

1. An electrode adapted to function as an anode or a directly heated cathode comprising a relatively porous sintered slug of finely divided metal particles of the ferrous group and finely divided particles of one or more oxides of the alkaline earth group intimately mixed and united with the metal particles, a holder for sustaining and holding the slug intact, said holder having an opening therein of relatively small area, serving as a slot through which emission from the slug may take place, and lead-in conductors connected to the slug at spaced points so that, when said conductors are connected to a source of voltage, the metal particles which form a multitude of conducting paths, are traversed by electric current to heat the oxide particles to emission temperatures.

2. An electron emitting electrode comprising a holder having a slot, a relatively porous sintered body packed in said holder and having a multitude of filamentary current conducting paths and comprising a mixture of finely divided metal particles and electron emitting oxide particles intimately united throughout the body of said sintered body, and lead-in conductors connected to the slug at spaced points for connecting the filamentary conducting paths formed by said metal particles across a source of voltage, said body, when heated to operating temperature, emitting electrons through the slot in the holder.

3. An electron emitting cathode for gaseous discharge and thermionic space current devices comprising a holder of refractory insulating material having a relatively deep spiral-like cavity which is open at one end and closed at the other, an electron emissive mass in said cavity comprising a sintered mass of finely divided metal particles constituting the current conducting heater portion of the filament and electron emitting oxide particles intimately united with the metal particles throughout the body of the mass, and lead-in conductors connected to the mass adjacent the inner and outer ends of the spiral so that when connected to a source of voltage current traverses the metal particles of the mass, thereby heating the electron emitting oxide particles to a temperature at which emission occurs, emission taking place from that portion of the mass which is exposed through the open end of the cavity.

4. An electron emitting cathode for gaseous discharge and thermionic space current devices comprising a holder of refractory insulating material having a relatively deep spiral-like cavity, which is open at one end and closed at the other, an electron emissive mass in said cavity comprising a sintered mass of finely divided metal particles, electron emitting oxide particles and finely divided particles of resistance material intimately united with the metal and oxide particles throughout the body of the mass, and lead-in conductors connected to the mass adjacent the inner and outer ends of the spiral, so that when connected to a source of voltage, current traverses the metal particles of the mass, thereby heating the electron emitting oxide particles to a temperature at which emission occurs, emission taking place from that portion of the mass which is exposed through the open end of the cavity.

5. An electron emitting cathode for gaseous discharge and thermionic space current devices comprising a holder of refractory material having a relatively deep spiral-like cavity which is open at one end and closed at the other, an electron emissive body in said cavity comprising a sintered mass of finely divided nickel particles, oxide particles of one or more of the alkaline earths intimately united with the metal particles throughout the body of the mass, and lead-in conductors connected to the mass adjacent the inner and outer ends of the spiral so that when connected to a source of voltage, current traverses the nickel particles of the mass thereby heating the oxide particles to a temperature at which emission occurs, emission taking place from that portion of the filamentary mass which is exposed through the open end of the cavity.

6. An electron emitting cathode comprising a holder of refractory insulating material having a slot therein, the area of which is relatively small in respect to the surface area of the holder, an emissive body in the holder comprising a sintered slug of finely divided metal particles and thermionically active oxide particles, intimately united throughout the body of the slug, and lead-in conductors attached to the slug at spaced points so that when said conductors are connected to a source of supply of voltage, current traverses the metal particles of the slug, thereby heating the oxide particles to emission temperature, emission from the slug being restricted to that portion of its surface which is exposed by the slot.

7. An electron emitting cathode comprising a holder of refractory insulating material having a slot therein, the area of which is relatively small in respect to the surface area of the holder, an electron emissive body in the holder comprising a sintered slug of finely divided metal particles, thermionically active oxide particles and finely divided particles of thermionically inert electric resistance material intimately united throughout the body of the slug, and lead-in conductors attached to the slug at spaced points so that when said conductors are connected to a source of supply of voltage current traverses the metal particles of the slug, heating the oxide particles to emission temperature, emission from the slug being restricted to that portion of its surface which is exposed by the slot.

8. An electron emitting electrode comprising a holder of refractory insulating material and having a slot therein of relatively small area as compared to the surface area of the holder, an electron emissive body in the holder comprising a sintered slug of finely divided nickel particles and alkaline earth oxide particles intimately united throughout the body of the slug, and lead-in conductors attached to the slug at spaced points so that when said conductors are connected to a source of supply of voltage current traverses the nickel particles of the slug and heats the oxide particles to emission temperature, emission from the slug being restricted to that portion of its surface which is exposed by the slot.

9. An electron emitting electrode comprising a holder of refractory insulating material and having a slot therein of relatively small area as compared to the surface area of the holder, an electron emissive body in the holder comprising a sintered slug of finely divided nickel particles, alkaline earth oxide particles and thermionically inert electric resistance material all intimately mixed and united throughout the body of the slug, and lead-in conductors attached to the slug at spaced points so that when said conductors are connected to a source of supply of voltage current traverses the nickel particles of the slug and heats the oxide particles to emission temperature, emission from the slug being restricted to that portion of its surface which is exposed by the slot.

10. An electron emitting cathode comprising an elongated hollow holder of metal having a plurality of perforations, a sintered slug in the holder and firmly contacting the wall surface thereof, said slug comprising a mixture of finely divided metal particles, and thermionically active particles intimately united with the metal particles throughout the body of the slug, a lead-in conductor attached to the metal holder, and a lead-in conductor extending into one end of the slug, so that when the lead-in conductors are connected to a supply of voltage, current traverses the metal particles of the slug heating the thermionically active particles to emission temperature, emission taking place through the perforations in the holder.

11. An electron emitting cathode comprising an elongated hollow holder of metal having a plurality of perforations, a sintered slug in the holder and firmly contacting the wall surface thereof, said slug comprising a mixture of finely divided metal particles, thermionically active oxide particles and finely divided particles of thermionically inert electric resistance particles intimately united with the metal particles throughout the body of the slug, a lead-in conductor attached to the metal holder, and a lead-in conductor extending into one end of the slug, so that when the lead-in conductors are connected to a supply of voltage, current traverses the metal particles of the slug, heating the oxide particles to emission temperature.

12. An electron emitting cathode comprising an elongated hollow holder of metal having a plurality of perforations, a relatively porous sintered slug in the holder and firmly contacting the wall surface thereof, said slug comprising a mixture of finely divided metal particles, and thermionically active oxide particles intimately united with the metal particles throughout the body of the slug, a lead-in conductor attached to the metal holder, and a lead-in conductor extending into one end of the slug, so that when the lead-in conductors are connected to a supply of voltage, current traverses the metal particles of the slug, heating the oxide particles to emission temperature.

13. An electron emitting cathode comprising an elongated hollow holder of nickel having a plurality of perforations in its walls, a sintered slug in said holder and firmly contacting the walls thereof, said slug comprising a mixture of finely divided nickel particles, and finely divided oxide particles, of the group including barium, intimately mixed with and adhering to the nickel particles throughout the body of the slug, a lead-in conductor secured to the holder and a lead-in conductor extending into the slug and spaced substantially symmetrically from the walls of the holder, so that when the lead-in conductors are connected to a supply of voltage, current traverses the nickel particles of the slug, heating the oxide particles to emission temperature.

14. An electron emitting cathode comprising an elongated holder of nickel having a plurality of perforations in its walls, a sintered slug in said holder and firmly contacting the walls thereof, said slug containing finely divided particles of nickel and oxides of one or more alkaline earths in substantially equal amounts, and finely divided electric resistance material intimately mixed with said particles throughout the body of the electrode, and lead-in conductors connected to the holder and slug so that when connected to a source of voltage, current traverses the nickel particles thereof, heating the oxide particles to emission temperature.

15. An electron emitting cathode comprising an elongated holder of nickel having a plurality of perforations in its walls, a relatively porous sintered slug in said holder and firmly contacting the walls thereof, said slug comprising a mixture of finely divided particles of nickel and oxides of one or more alkaline earths intimately united throughout the body of the slug, a lead-in conductor secured to the holder and a lead-in conductor extending into the slug and spaced substantially symmetrically from the walls of the holder, so that when the lead-in conductors are connected to a supply of voltage, current traverses the nickel particles of the slug, heating the oxide particles to emission temperature.

16. An electron emitting cathode comprising an elongated holder of nickel having a plurality of perforations in its walls, a relatively porous sintered slug in said holder and firmly contacting the walls thereof, said slug containing finely divided particles of nickel and oxides of one or more alkaline earths in substantially equal amounts, and finely divided electric resistance material intimately united throughout the body of the electrode, and lead-in conductors connected to the holder and slug so that when connected to a source of voltage, current traverses the nickel particles thereof, heating the oxide particles to emission temperature.

17. A thermionically active electrode comprising a holder having spaced coiled walls of refractory insulating material providing a relatively narrow space between them, a packing in said space of finely divided metal particles and particles having electron emissive properties when heated, said particles being intimately mixed and coherent throughout, and means for connecting said packing to a source of voltage so that current traversing the metal particles will heat the electron emissive particles to emission temperature.

18. A thermionically active electrode comprising a holder having spaced coiled walls of refractory insulating material providing a relatively narrow space between them, a packing in said space of finely divided metal particles and oxide particles having electron emissive properties when heated, said particles being intimately mixed and coherent throughout, a refractory shield disposed around said holder, and means for connecting said packing to a source of voltage so that current traversing the metal particles will heat the oxide particles to emission temperature.

19. A thermionically active electrode comprising a holder having spaced coiled walls of refractory insulating material providing a relatively narrow space between them, a relatively porous sintered packing in said space of finely divided metal particles and oxide particles having electron emissive properties when heated, said particles being intimately mixed and coherent throughout, and means for connecting said packing to a source of voltage so that current traversing the metal particles will heat the oxide particles to emission temperature.

20. A thermionically active electrode comprising a holder having an open cavity therein, a packing within said cavity comprising a sintered mixture of metal particles and oxide particles having electron emissive properties when heated, the metal particles forming a multitude of current conducting heating elements of the first class and means for effecting a flow of heating current through the metal particles acting as conductors of the first class to heat the oxide particles to emitting temperature.

21. A thermionically active electrode comprising a holder having an open cavity therein, a packing in said cavity comprising a sintered mixture of metal particles, oxide particles having electron emissive properties when heated and relatively inactive particles of electric resistance material intimately mixed with the metal and oxide particles, the metal particles forming a multitude of current conducting heating elements of the first class and means for effecting a flow of heating current through the metal particles acting as conductors of the first class to heat the oxide particles to emitting temperature.

22. A directly heated thermionically active electrode comprising a sintered body of finely divided intimately mixed metal and electron emitting particles, a holder provided with a cavity for receiving said body, said holder maintaining said body intact while in the process of manufacture and while in operation, said metal particles constituting current conductors of the first class and means for causing electric heating current to traverse the paths formed by said metal particles and develop by resistance heating the heat required to raise the electron emitting particles to emitting temperature.

23. A directly heated thermionically active electrode comprising a sintered body of finely divided intimately mixed metal and electron emitting particles, the metal particles forming a multitude of current conducting resistance paths of the first class and finely divided refractory electric resistance material in amount sufficient to substantially stabilize the electrical resistance of the sintered body, a holder provided with a cavity for receiving said body and maintaining the same intact while in the process of manufacture and while in operation, and means for causing electric heating current to traverse the paths formed by the metal particles and develop the heat required to raise the electron emitting particles to emitting temperature.

24. An electron emitting electrode for gaseous discharge and thermionic devices comprising a slotted holder, a relatively porous sintered body disposed in and sustained by said holder and comprising a mixture of finely divided metal particles which form a multitude of filamentary current conducting paths in said body, electron emitting oxide particles and finely divided electronically inert particles of high ohmic resistance intimately united with said oxide and metal particles, and lead-in conductors attached to the slug at spaced points so that when connected to a source of voltage, current flows through the metal particles of the slug to heat the electron emitting particles to a temperature at which emission occurs.

25. An electron emitting cathode for gaseous discharge and thermionic space current devices comprising a holder of refractory insulating material having a relatively deep spiral-like cavity which is open at one end and closed at the other, an electron emissive body in said cavity comprising a sintered mass of finely divided metal particles constituting the current conducting heater portion of the body and electron emitting particles intimately united with the metal particles throughout the body of the mass, and lead-in conductors connected to the mass adjacent the inner and outer ends of the spiral so that when connected to a source of voltage current traverses the metal particles of the mass, thereby heating the electron emitting particles to a temperature at which emission occurs, emission taking place from that portion of the body which is exposed through the open end of the cavity.

26. An electron emitting cathode for gaseous discharge and thermionic space current devices comprising a holder of refractory insulating material having a relatively deep spiral-like cavity, which is open at one end and closed at the other, an electrically conductive and electron emitting mass in said cavity comprising a sintered mass of finely divided metal particles, electron emitting particles and finely divided particles of resistance material intimately united with the metal and emitting particles throughout the body of the mass, and lead-in conductors connected to the mass adjacent the inner and outer ends of the spiral, so that when connected to a source of voltage, current traverses the metal particles of the mass, thereby heating the electron emitting particles to a temperature at which emission occurs, emission taking place from that portion of the mass which is exposed through the open end of the cavity.

27. An electron emitting cathode for gaseous discharge and thermionic space current devices comprising a holder of refractory material having a relatively deep spiral-like cavity which is open at one end and closed at the other, an electron emitting body in said cavity comprising a sintered mass of finely divided nickel particles, electron emitting particles of one or more of the alkaline earths intimately united with the metal particles throughout the body of the mass, and lead-in conductors connected to the mass adjacent the inner and outer ends of the spiral so that when connected to a source of voltage, current traverses the nickel particles of the mass thereby heating the emitting particles to a temperature at which emission occurs, emission taking place from that portion of the mass which is exposed through the open end of the cavity.

28. A thermionically active electrode for use in space current devices, comprising a holder having a cavity therein and provided with an opening thereto, a slug comprising a sintered mixture of metal particles and electron emissive particles, disposed within said cavity and in close contact with the walls thereof, whereby emission takes place only from the surface of the slug presented to said opening, and means independent of the current emitted from the exposed surface of the slug for heating the slug to a temperature at which current is emitted through said opening from the exposed surface of the slug.

29. An electron emitting cathode for space current devices comprising a holder of refractory insulating material having a spiral-like open cavity therein, an electron emissive body in said cavity comprising a sintered mass of finely divided metal particles and electron emitting particles intimately united with the metal particles throughout the body of said mass, and means for heating said mass to raise the temperature of the surface exposed through the opening of said cavity to a value at which electron emission takes place from the electron emitting particles at said surface.

GERALD B. TJOFLAT.